United States Patent [19]

Dannoux et al.

[11] Patent Number: 5,528,713
[45] Date of Patent: Jun. 18, 1996

[54] OPTICAL COMPONENT CONNECTED TO AN ARRAY OF OPTICAL FIBERS

[75] Inventors: Thierry L. A. Dannoux, Avon; Serge A. M. Renault, Montigny S/Loing, both of France

[73] Assignee: Corning Incorporated, Corning, N.Y.

[21] Appl. No.: 442,240

[22] Filed: May 15, 1995

Related U.S. Application Data

[63] Continuation of Ser. No. 75,124, Jun. 10, 1993, abandoned.

[30]    Foreign Application Priority Data

Jun. 19, 1992 [FR] France ................................ 92 07490

[51] Int. Cl.[6] ............................................. G02B 6/36
[52] U.S. Cl. ............................... 385/80; 385/51; 385/49
[58] Field of Search ................................. 385/80, 78, 77, 385/76, 14, 15, 20, 49, 51, 39

[56]    References Cited

U.S. PATENT DOCUMENTS 4,943,130  7/1990  Dannoux et al. .......................... 385/49
5,113,460  5/1992  Hakoun et al. ........................... 385/39
5,123,068  6/1992  Hakoun et al. ........................... 385/14
5,185,835  2/1993  Vial et al. ................................. 385/49
5,231,683  7/1993  Hockaday et al. ........................ 385/49

FOREIGN PATENT DOCUMENTS 0283203   9/1988   European Pat. Off. ................. 385/49
0455090  11/1991   European Pat. Off. ............. 385/49 X
9103089   3/1991   France ..................................... 385/49

Primary Examiner—John D. Lee
Assistant Examiner—Phan T. H. Palmer
Attorney, Agent, or Firm—William Greener

[57]    ABSTRACT

The fibers are connected to the component by adhesive means comprising a plurality of drops ($11_i$, $12_i$) of an adhesive product, each of them fixing to the component between 1 and (N−1) adjacent fibers of the array, each of these drops being non-contiguous with at least one other of these drops, and at least one of the drops being longitudinally and laterally offset with respect to at least one other drop of the plurality.

6 Claims, 1 Drawing Sheet

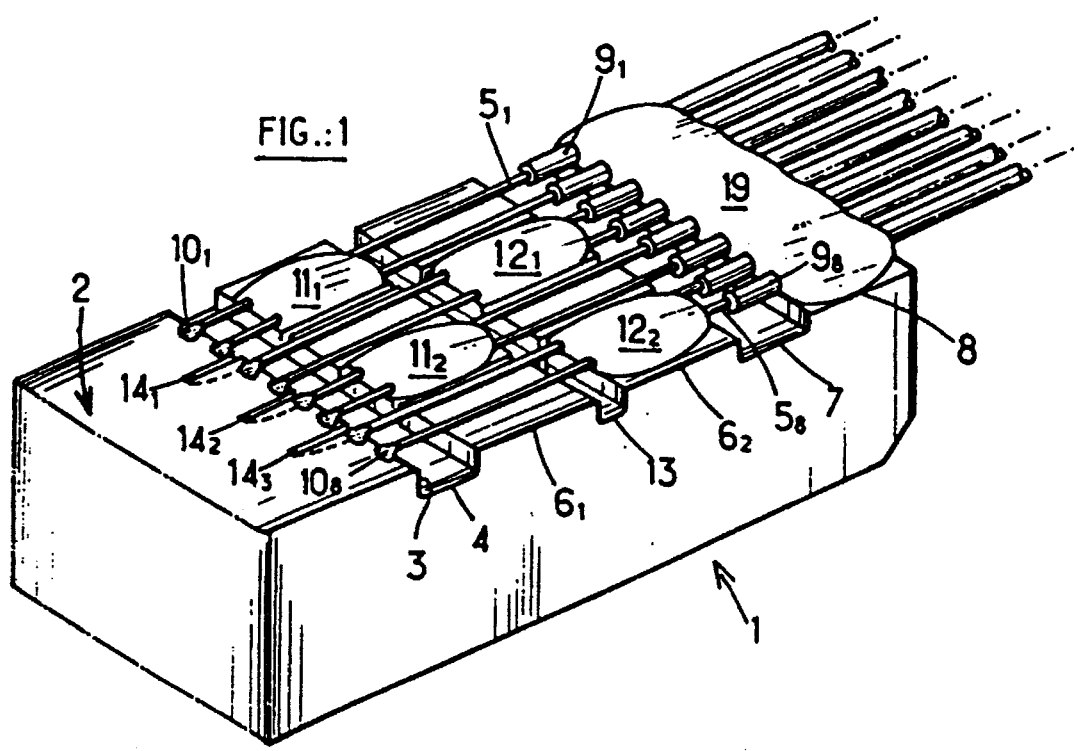
FIG.:1
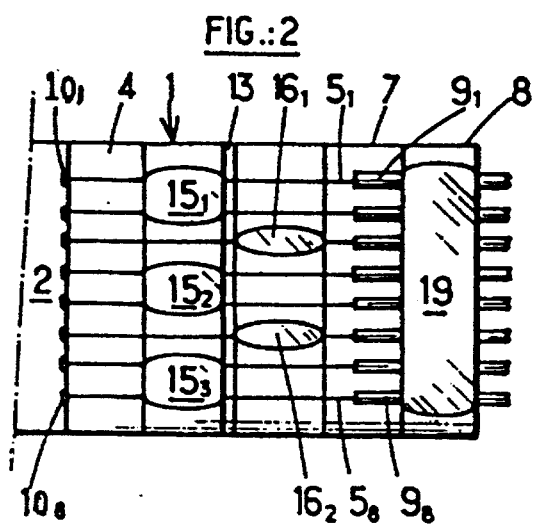
FIG.:2
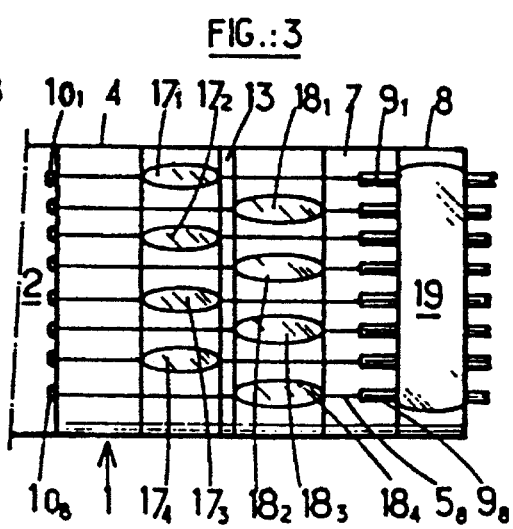
FIG.:3

OPTICAL COMPONENT CONNECTED TO AN ARRAY OF OPTICAL FIBERS

This is a continuation of application Ser. No. 08/075,124 filed on Jun. 10, 1993 (abandoned).

BACKGROUND OF THE INVENTION

The present invention relates to an optical component connected to an array of optical fibers, and more specifically to an integrated optical component comprising N waveguides integrated into a glass substrate and respectively connected to the ends of N single-mode or multimode optical fibers. Even more specifically, the invention relates to such a component in which the fibers are glued to the substrate on the one hand at the fiber end that faces an output of the waveguide, on the other hand at a location distant from this output.

Such integrated optical components are known, for example in the French patent No. 2 612 301 filed 12 Mar. 1987 and assigned to Corning Glass Works. In accordance with the specifications of the preliminary specification T.A.NWT 000 442 published in November 1990 by Bellcore Laboratory (USA), such optical components must pass predetermined tests which assure in particular the mechanical strength of the fiber/substrate attachment and the good transmission quality of an optical signal. The mechanical strength is tested by a pulling force which is exerted upon the fiber/substrate attachment. This attachment must resist a force of 5N across the temperature range from −40° C. to +85° C., or in an atmosphere of 93% relative humidity at 60° C., or further during aging for 2000 hours at 85° C. Moreover, the signal loss observed for a transmitted optical signal must not exceed a predetermined threshold, for example 0.3 dB for a component with one input and two outputs.

An integrated optical component of the type described in the patent cited before, in which at least one waveguide integrated into a substrate is coupled at the output to an optical fiber which is attached to the substrate at this output and in a region separated therefrom, by at least first and second drops of adhesive product respectively, is described in the French patent application No. 91 03089 filed 14 Mar. 1991 by the applicant. The differential thermal expansions that could affect the optical continuity of the fiber/substrate combination as well as the mechanical strength of this combination are absorbed with an appropriate choice of the glass transition temperature of the two drops.

If it is attempted to apply the solutions described in the documents cited above to an integrated optical component connected to N parallel and adjacent optical fibers, difficulties are encountered as soon as N increases. It is the case for example, when one attempts to realize a component such as a 1×8 coupler, comprising at one end eight optical fibers connected in parallel—with a 350 µm step for example—to eight aligned waveguide outputs formed in the component substrate. During the manufacture of such a component, the eight ends of the fibers are coaxially aligned, through suitable micromanipulations, with the eight waveguide outputs formed into the substrate, and are attached in these positions by eight drops of adhesive product with an optical quality insuring the optical continuity of the fibers and the waveguides. Following the design and process set forth in the documents cited above, the fibers are attached to the substrate upstream of these drops, by one drop of adhesive product spreading transversely across all the fibers in order to firmly attach them to the substrate.

If such a component is then submitted to the mechanical strength, temperature and humidity tests defined in the preliminary specification cited before, detachment of the glue drop deposited across the fibers can be observed, especially at the two transverse ends of it. It is clear that this phenomenon can very seriously affect the solidity of the fiber/substrate attachments at a point near the fiber/waveguide interfaces. Any disorder at this level can furthermore cause a harmful attenuation of the optical signals transmitted across the fiber/waveguide interfaces.

The present invention has therefore as its aim the manufacture of an optical component connected to an array of N adjacent optical fibers by adhesive means, and designed to avoid any detachment of the adhesive means used to attach the fiber to the substrate of the component, even with a great number N of fibers connected to the component.

This object of our invention, as well as others which will appear from the following description, are achieved by an optical component connected to a planar array of (N) adjacent optical fibers by adhesive means, these adhesive means comprising a plurality of drops of an adhesive product, each of them fixing between 1 and (N−1) adjacent fibers of the array to the component, each of these drops being non-contiguous to at least other of these drops, and at least one of the drops being axially and laterally offset with respect to at least one other drop of the plurality.

According to a preferred method of manufacturing the component in accordance with the present invention, transverse and longitudinal grooves are formed in the component to delimit the extension of each of said drops.

Other characteristics and advantages of the component in accordance with the invention will appear upon reading the following description and upon examination of the attached Figures:

FIG. 1 depicts a partial perspective view of a preferred embodiment of an integrated optical component connected to a planar array of optical fibers in accordance with the present invention, and FIG. 2 and FIG. 3 are plan views of drops of adhesive product, usable in other embodiments of the present invention.

The optical component in accordance with the present invention is of the type described in the patent and the patent application cited above. It is therefore more particularly, but not exclusively, of the type used in integrated optics and comprises a substrate 1 in glass, for example, in which waveguides (not shown) are formed by ion exchange, for example.

The component comprises N waveguides formed in the vicinity of a planar surface 2 of the substrate, these guides emerging in parallel on a side 3 of a transverse groove 4 formed in the substrate. The parallel stripped ends $5_1$ to $5_8$ of a planar array of optical fibers (N=8 in FIG. 1) rest upon a step $(6_1, 6_2)$ which is formed upon the component between the groove 4 and another transverse groove 7. A step 8, of lesser height than the step $6_1, 6_2$, is formed upon the substrate 1 behind the groove 7 in order to receive the coated portions $9_1$ to $9_8$ of the fibers. During the manufacture of the component, the ends of the fibers are centered by micromanipulations on the corresponding outputs of the waveguides that emerge on the side 3 of the groove 4, and are attached to them by drops $10_1$ to $10_8$ of an adhesive product with a suitable transparency that insures the optical continuity of the fiber and the associated waveguide. All these provisions are known and better described in the patent and patent application cited above.

As an illustrative and non restricting example, the steps of the fibers can be 350 μm. When the number of optical fibers is great, the width of the surface covered by these fibers can then be relatively important. If it is then attempted to insure the mechanical bond of the fibers and the substrate in a standard way, by a single drop of an adhesive product spreading over the entire width of the array of fibers, a detachment of the drop, which separates from the substrate beginning at its transverse ends, can be observed as a result of the temperature and humidity tests defined in the preliminary specification cited in preamble to the present patent application. The extent of this detachment is greater when the adhesive drop is larger, that is to say when the number N of fibers is great. As a result, there is a weakening of the mechanical attachment between the fibers and the substrate of the component, which the present invention aims to avoid. The invention is thus principally aimed at optical components for which N is large, as is the case, for example, in 1×4, 1×8 or 1×16 couplers. Generally, the invention relates to components in which the number of fibers to be connected to the component is greater than two, with steps similar to those mentioned above.

In accordance with the invention, the bond between the N stripped fibers and the step $6_1$, $6_2$ of the substrate upon which they rest is insured by a plurality of drops of an adhesive product, each fixing to the component between 1 and (N–1) adjacent fibers of the array. The various drops are non-contiguous and axially as well as transversely offset one with respect to another, the "axial" direction being defined by the direction of the fibers on the step $6_1$, $6_2$.

In FIG. 1, it is apparent that the bond between the fibers and the substrate 1 is insured by two transverse rows of drops ($11_1$, $11_2$) and ($12_1$, $12_2$) respectively, of an adhesive product, each drop enveloping two adjacent fibers, and two adjacent drops being longitudinally offset one with respect to the other. In this way each drop has a transverse size far smaller than that of a single drop which would cover all the fibers. As the variations of air temperature and humidity cause swelling/shrinkage of each drop, which causes the detachment of the adhesive mentioned above, one understands that reducing the volume of each drop automatically reduces the extent of these phenomena, as a function of the volume of adhesive put in play. Thus the detachment of smaller drops is then prevented, and the mechanical bond between the fibers and the substrate therefore keeps all its strength.

A bond made with several adjacent drops transversely aligned could be imagined. Such a solution is hardly feasible, for the adhesive drops applied in a fluid state on the substrate would spread out and eventually join each other because of their excessive proximity. By disposing the drops in a number of transverse rows, as shown in FIG. 1, this drawback is avoided thanks to the resulting greater space between the drops.

According to a preferred embodiment of the invention, the substrate has furthermore transverse, 4, 7, 13, and longitudinal, $14_1$, $14_2$, $14_3$, clearance grooves that delimit the extension surface of each drop $11_1$, $11_2$, $12_1$, $12_2$. During the manufacture of the component according to the invention, the product constituting the adhesive is applied in a fluid state upon four locations of the step $6_1$, $6_2$ delimited by the grooves cited above. Among them, one notices the additional transverse groove 13 that divides step $6_1$, $6_2$ in two parts, according to the invention. As a result of surface tension phenomena, the spreading of the fluid drops stops at the edges of the rectangular surfaces delimited by the grooves. It is therefore avoided that drops deposited on separated areas eventually join each other, resulting in larger drops and therefore drops that are more sensitive to detachment phenomena.

Of course, the arrangement of drops represented in FIG. 1 is not the only one capable of establishing a strong mechanical bond between the fibers and the substrate with the help of a plurality of small sized drops, less subject to detachments under the effect of swelling/shrinkage of these drops. Thus, FIGS. 2 and 3 represent two other types of drop arrangement permitting the achievement of the same results. We have represented in FIG. 2 a row of drops $15_1$, $15_2$, $15_3$, each of them enveloping two adjacent fibers, these drops being separated by a drop in the other row ($16_1$, $16_2$) enveloping only one fiber. In FIG. 3, two rows of drops $17_1$ to $17_4$, $18_1$ to $18_4$ respectively, have been disposed, each of them coveting one fiber, two adjacent fibers being attached by two longitudinally offset drops. Of course, the invention is not limited to the drop arrangements described and represented, and many other arrangements could be utilized, with drops covering more fibers or arranged on more than two transverse rows.

Returning to FIG. 1 of the attached drawings, it is noted that a long transverse drop of adhesive 19 is deposited upon the coated part $9_1$ to $9_8$ of the fibers, at the end of the substrate 1 of the component, this being in apparent contradiction to the design and process set forth above. It should be noted, on the one hand, that this drop 19 does not directly act on the fibers, but on the coating of these fibers, and therefore does not directly take part in the real attachment of the fibers to the substrate. This drop attaches only the coatings to the substrate; the coatings then insure the guiding of the fibers inside their respective coating in case of differential thermal expansion. On the other hand a component such as the one represented in FIG. 1 is usually confined in a protective case that presses, directly or through a suitable covering resin, the drop 19 and the coated parts $9_1$ to $9_8$ of the fibers against the substrate: the risks of detachment of this drop 19 are therefore virtually non-existent. However it is clear that this drop 19 could as well be divided in drops, such as the drops $11_1$, $11_2$, $12_1$, $12_2$ for example, if necessary.

In accordance with the design and process set forth in the application for French patent No. 91 03089 previously cited, the adhesive products used in the optical component according to the invention could be, in particular, composed of acrylic or vinyl resins with free radical polymerization. Therefore one can use monomers or oligomers of the acrylic or vinyl type containing one or more double bonds, which give rise to free radical polymerizations initiated by a photoinitiator which, under the action of light (visible or ultra-violet, for example), will create free radicals. Numerous commercially available resins are suitable for making the adhesive products used in the present invention. For example, adhesive resins suitable for making drops $10_1$ to $10_8$ insuring the bond between the fibers and the waveguides are commercialized by ELOSOL Ltd. Corporation (French Company—ELECOPRODUIT) under the trade names VITRALIT 6128, 7104, 7105 and 7106. Adhesives suitable for making the drops $11_1$, $11_2$, $12_1$, $12_2$ are commercialized by the French Corporation EPOTECHNY under the trade names NOA 81, NOA 61, and by the English Corporation IMPERIAL CHEMICAL INDUSTRIES under the trade names LCR 000 and LCR 070, LCR 050, LCR 000V, LCR 000/1.52.

Of course, the invention is not limited to the embodiments described and represented herein which have only been given as an example. Thus, the invention applies to the realization, not only of couplers, but also of dividers, multiplexers, etc., whether or not they are realized in integrated optics.

We claim:

1. An optical component connected to a planar array of (N) adjacent optical fibers by adhesive means, N being an integer greater than one, characterized in that these adhesive means comprise a plurality of drops ($11_1$, $12_1$, $15_1$, $16_1$, $17_1$, $18_1$) of an adhesive product, each of them fixing between 1 and (N–1) adjacent fibers of the array to the component, each of these drops being non-contiguous with any other of said drops, and each one of the drops being axially and laterally offset with respect to an immediately adjacent other drop of the plurality of drops.

2. The component according to claim 1, characterized in that it comprises at least two transverse rows of drops, these two rows being separated by a transverse groove (13) formed in the component.

3. The component according to claim 1 or 2, characterized in that it comprises at least one longitudinal groove ($14_1$, $14_2$, $14_3$) formed in the component to delimit the transverse extension of at least one adjacent drop.

4. The component according to claim 2, characterized in that it comprises at least one longitudinal groove formed in the component to delimit the transverse extension of two drops ($11_1$, $12_1$) of adhesive product that belong to two different rows.

5. The component according to claim 1, comprising a substrate in which N waveguides are integrated, with the transversely aligned outputs of these waveguides being axially attached to N facing ends of optical fibers, characterized in that a transverse groove (4) formed in the substrate next to these joining ends delimits the longitudinal extension of a row of drops fixing the fibers to the substrate, on the side of the joined ends.

6. The component according to claim 5, comprising means (19) for luring a coated portion ($9_1$ to $9_8$) of each fiber to the substrate, upstream of the drops fixing the fibers to the substrate, characterized in that a second transverse groove (7) formed in the substrate next to this means delimits the longitudinal extension of one row of adjacent drops on the side of the coated portions of the fibers.

* * * * *